US012637977B2

(12) United States Patent　　　　　(10) Patent No.:　US 12,637,977 B2

Casado Montero et al.　　　　　　　　(45) Date of Patent:　　May 26, 2026

(54) FUEL CONDITIONING SYSTEM

(71) Applicant: AIRBUS OPERATIONS, S.L.U., Madrid (ES)

(72) Inventors: Carlos Casado Montero, Madrid (ES); Pablo Manuel Calderón Gómez, Madrid (ES); María Cruz Zamarro Martín, Madrid (ES); Agustín Gómez Fernández, Madrid (ES); David Castaño De La Mota, Madrid (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 0 days.

(21) Appl. No.: 18/525,143

(22) Filed: Nov. 30, 2023

(65) Prior Publication Data

US 2024/0218832 A1　　　Jul. 4, 2024

(30) Foreign Application Priority Data

Dec. 28, 2022　　(EP) .................................... 22383300

(51) Int. Cl.
　　*F02C 7/224*　　　　(2006.01)
　　*B64D 37/34*　　　　(2006.01)
　　*B64D 41/00*　　　　(2006.01)
(52) U.S. Cl.
　　CPC .............. *F02C 7/224* (2013.01); *B64D 37/34* (2013.01); *B64D 41/00* (2013.01); *F05D 2260/20* (2013.01)
(58) Field of Classification Search
　　CPC ...... F02C 7/224; B64D 41/00; F05D 2260/20
　　See application file for complete search history.

(56) References Cited

U.S. PATENT DOCUMENTS

| | | | | |
|---|---|---|---|---|
| 2006/0162315 A1* | 7/2006 | Bruckner | .............. | F22B 1/1861 |
| | | | | 60/39.182 |
| 2007/0095068 A1* | 5/2007 | Joshi | ....................... | F02C 7/224 |
| | | | | 60/736 |
| 2012/0067055 A1* | 3/2012 | Held | ........................ | F02C 1/06 |
| | | | | 60/772 |
| 2015/0300260 A1* | 10/2015 | Wollenweber | ........... | F02C 9/40 |
| | | | | 60/39.12 |
| 2015/0321767 A1 | 11/2015 | Kamath et al. | | |
| 2015/0330312 A1* | 11/2015 | Delgado | ................... | F02C 9/40 |
| | | | | 60/39.463 |

(Continued)

FOREIGN PATENT DOCUMENTS

JP　　　　2013019378 A　　　1/2013

OTHER PUBLICATIONS

Extended European Search Report for EP Application No. 22383300.5 dated Jun. 7, 2023, 11 pages.

*Primary Examiner* — Phutthiwat Wongwian
*Assistant Examiner* — Roberto Toshiharu Igue
(74) *Attorney, Agent, or Firm* — Nixon & Vanderhye P.C.

(57)　　　　　　ABSTRACT

A conditioning system for an aircraft including a fuel conduit which receives a liquid fuel, an evaporator and a heater which heat the liquid fuel to convert the fuel to a gas fuel supplied to an engine on the aircraft, the evaporator transfers heat from a hot working fluid to the liquid fuel and the heater converts energy into heat applied to the liquid fuel, and a heat recovery circuit which circulates the working fluid through the evaporator and a heat exchanger in a hot exhaust gas stream generated by the engine.

13 Claims, 2 Drawing Sheets

(56)                    References Cited

U.S. PATENT DOCUMENTS

2015/0337730 A1*  11/2015  Kupiszewski ............ F02C 7/16
                                                   60/39.465
2020/0140114 A1*   5/2020  Andrews, Jr. ............. F02C 6/08
2021/0156308 A1*   5/2021  Jones .................. F28D 21/0003
2021/0301720 A1*   9/2021  Staubach ................ F02C 1/007
2022/0099299 A1    3/2022  Carrotte et al.

* cited by examiner

FUEL CONDITIONING SYSTEM

RELATED APPLICATION

This application incorporates by reference and claims priority to European Patent Application EP22383300.5, filed Dec. 28, 2022.

TECHNICAL FIELD

The present invention relates to a conditioning system for an aircraft. In particular, the present invention belongs to a conditioning system having a new architecture including a power unit and a heat recovery circuit. The present invention also relates to an aircraft comprising said conditioning system and to a method for conditioning fuel by means of the conditioning system of the invention.

BACKGROUND

Auxiliary power units (APUs) are well known in the aeronautical technical field for being engines capable of supplying energy to functions of an aircraft that are not considered as propulsion functions. APUs are generally found in large aircrafts and located at/or near to the tail cone part of these aircrafts.

Typical APUs generally comprise a power section being the power-producing section of the APU, a load compressor section providing pneumatic power for the aircraft and a gearbox section responsible for transferring power from the main shaft of the engine to a generator for electrical power. APUs are also known for allowing an aircraft to be autonomous of the external electrical and pneumatic power sources on the ground and in-flight.

Additionally, Auxiliary Power Units in an aircraft can be used for replacing the primary engines when they are not running when said aircraft is on-ground. APUs also sustain temporal power to start the primary engines during normal operations, they can be used to replace the power generated by primary engines when failed for dispatch conditions or continuously implemented for supplying emergency power until the aircraft lands.

The prior art discloses engine implementing hydrogen combustion applied in the automotive field.

Also, in the field of gas turbine for aircraft, well known technologies provide exhausting gas heat recovery. However, these techniques and technologies used nowadays are applicable to fossil fuel engines.

Known issues of hydrogen engine are based on conditioning the hydrogen fuel up to ambient temperature and correct pressure in order to feed the engine of the APU in proper conditions and, also, ensuring a secured combustion avoiding damages in the different components and conduits of said Auxiliary Power Unit. Due to its storing conditions, around 20K in the aeronauticoeld of technique, hydrogen is a fuel which requires particular sizing and particular operational conditions of the system consuming this type of fuel.

Also, additional known problems of using hydrogen for an engine in an aircraft is due to phase transitions since, when stored in the aircraft before feeding the engine, the hydrogen is in liquid phase. However, in order for the engine of an APU to work in optimal manners, the liquid hydrogen has to be brought through a phase transition from liquid to gas. These phase changes also requires that the system is designed and sized in such a way that hydrogen stays stable while its conditions (Temperature, Pressure, Phase etc.) is changing throughout the whole Auxiliary Power System.

Therefore, there is a need in the art for a conditioning system allowing the recycling of heat produced by an hydrogen engine, more particularly from exhaust gases, when implemented in an aircraft and sizing said system to the particular case of aircrafts and a conditioning system capable of maintaining the hydrogen in its optimal condition in any flight or ground operation of an aircraft.

SUMMARY

The present invention may be embodied to provide a fuel conditioning system for an aircraft.

In a first inventive aspect, the invention provides a conditioning system for an aircraft comprising a power unit, wherein the power unit comprises:

a fuel inlet configured to supply liquid fuel to a fuel conduit, an engine comprising an inlet connected to the fuel conduit and an outlet connected to a power unit outlet, the power unit outlet being configured to exhaust gases out of the engine, evaporator comprising a fuel inlet and a fuel outlet wherein the evaporator are configured to supply heat to the fuel in the fuel conduit and turn the fuel in the fuel conduit from liquid form or supercritical fluid form (SCF) into low temperature gas form at the fuel outlet, heater comprising a fuel inlet and a fuel outlet, the heater being connected to the evaporator and wherein the heater are configured to supply heat to the fuel in the fuel conduit, wherein the conditioning system comprises a heat recovery circuit comprising a heat exchanger, in fluid communication with the evaporator, and a working fluid, the heat exchanger is connected to the power unit outlet, comprises an inlet and an outlet, and is configured to transfer heat from the exhaust gases of the power unit outlet to the working fluid, the heat recovery circuit being configured to supply heat from the heat exchanger to the evaporator via/through the working fluid, and the evaporator are configured to supply heat from the working fluid of the heat recovery circuit to the fuel in the fuel conduit.

The conditioning system comprises a power unit. In some embodiments, the power unit is an Auxiliary Power Unit, also called APU, or any propulsion system configured for delivering power to an aircraft. In the particular embodiment of the power unit being an APU, said Auxiliary Power Unit is configured for providing standard APU functions which are to deliver electrical and pneumatic power for ground operations and flight operations. Also, the conditioning system is suitable to be installed in an aircraft.

The power unit comprises a fuel conduit configured to supply liquid fuel to a fuel conduit. The fuel conduit is feeding the power unit by means of a fuel inlet and is further connected to its other end at the power unit outlet.

The fuel provided to the fuel inlet is in a liquid phase and previously stored at specific temperature and pressure conditions. In some embodiments, the fuel is stored at a temperature in a range from 20K to 30K. At the fuel inlet, said fuel is injected at a temperature comprised in said temperature range.

The power unit also comprises evaporator comprising a fuel inlet and a fuel outlet. The evaporator are configured to supply heat to the fuel in the fuel conduit and to turn the fuel in the fuel conduit from liquid form into gas form. One of the main functions of the evaporator is to condition the fuel entering said evaporator from an inlet temperature to an outlet temperature where the outlet temperature is significantly higher than the inlet temperature while said fuel also transforms the fuel from liquid form or supercritical fluid form (SCF) into low temperature gas form.

In some embodiments, the evaporator are able to provide consistent behaviour for high gradients of temperatures such as from cryogenic temperature, between 20K and 30K. In some embodiments, the fuel at the fuel inlet of the evaporator is in supercritical fluid form (SCF) or into low temperature gas form and, at the fuel outlet of the evaporator, the gas fuel is conditioned up to ambient temperature, preferably between 225K and 330K.

The power unit further comprises heater connected to the evaporator and configured to supply heat to the fuel in the fuel conduit. The heater also comprise a fuel inlet and a fuel outlet.

When the aircraft is still on ground and the engine of the power unit is not running yet, the temperature of the fuel injected into the engine, and the power unit in general, is too low for the system to work safely and for the fuel to be provided to the engine in its operative conditions such as temperature, pressure and phase. In these conditions when the fuel temperature is low, i.e. a cold start, the engine consumes more fuel and more heat is required for the fuel to be provided in operative conditions. Therefore, the heater are responsible for providing the energy and heat required so that the fuel in the fuel conduit reaches all of these operative conditions.

The heater are to be considered as a support to the conditioning system which, in fully operative mode, is to be turned off and the conditioning system is providing the required energy/heat to the fuel in the fuel conduit by means of the evaporator only. The heater energy provided to the fuel conduit is decreasing at the same time the energy provided to the fuel conduit by the evaporator is increasing. That is, the balance between the heater and the evaporator is considered as an active control of the conditioning system, more particularly of the fuel of the power unit.

Advantageously, heating the fuel by means of the heater avoids the conditions of a cold start of the engine which is considered the worst start-up conditions for any embodiment of the power unit, such as Auxiliary Power Units or propellers (ram air turbine (RAT)). In particular, cold start of the engine is the worst start-up conditions for the power unit since more fuel is necessary for the engine to start and, at the same time, it is when more heat is required from the heater.

In some embodiments, the heater comprise dedicated external batteries which ensure providing energy to the heater such that heat is provided to the fuel in the fuel conduit by means of the heater while being independent from the generated power of the power unit. In addition, by having dedicated external batteries, the aircraft is considered autonomous.

The power unit also comprises an engine comprising an inlet connected to the fuel conduit and an outlet connected to the power unit outlet. The power unit outlet is configured to exhaust gases out of the engine.

In some embodiments, the engine is a gas turbine.

In some embodiments, the power unit outlet comprises a silencer or muffler.

The conditioning system may also comprise a heat recovery circuit. The heat recovery circuit comprises a heat exchanger, recovering heat from the exhaust gases of the power unit, which is in fluid communication with the evaporator of the power unit. Also, the heat recovery circuit comprises a working fluid which is to be understood as the fluid being recirculated inside the heat recovery circuit.

Also, the heat recovery circuit is to be considered as an independent and a closed circuit where the fuel and the working fluid never enter in direct contact or mingle.

The heat exchanger length ensures that the pressure drop is minimized. In some embodiment, the heat exchanger is a pillow plate heat exchanger, or PPHE.

Additionally, the heat exchanger has null or low performance rates in the start-up phase of the power unit but still requires to reach its operative conditions as quick as possible in order to optimize the heat recovery circuit performance and, therefore, the whole power unit performance.

The heat recovery circuit is configured to supply the working fluid heat from the exhaust gases of the power unit to the fuel in the fuel conduit by means of the evaporator. That is, the fuel conduit of the evaporator and the heat recovery circuit share common surfaces in order to transfer said heat recycled from the heat recovery circuit.

Advantageously, the evaporator and the part of the heat recovery circuit having common surfaces have a compact shape which benefit the whole sizing of the conditioning system. In an embodiment, said part of the heat recovery circuit in contact with the fuel conduit in the evaporator has a multiple S-bends shape.

The working fluid of the heat recovery circuit is constantly recycled and in motion, while the power unit of the conditioning system is either in operative conditions, i.e., while is running, or while the power unit of the conditioning system is not running in order to avoid that said working fluid freezes when entering in contact with the fuel conduit where the fuel is at a substantially lower temperature than the temperature of the working fluid at this specific location which is the first point of contact of the working fluid with the fuel conduit of the power unit, which is located near the fuel inlet of the evaporator.

The heat exchanger of the heat recovery circuit is connected to the power unit outlet and is configured to transfer heat from the exhaust gases of the power unit outlet to the working fluid inside the heat recovery circuit. Advantageously, the heat exchanger covers the entire perpendicular cross-section of the power unit outlet in order to exploit the most heat from the exhaust gases generated the functioning of the power unit.

Also, even though the heat recovery circuit is configured for transferring heat from the working fluid to the fluid of the fluid conduit by means of the evaporator, said heat recovery circuit, since it is a closed circuit, is physically uncoupled from the fuel conduit and, thus, uncoupled from the engine. Therefore, if either the fuel conduit of the power unit or the heat recovery circuit is/are damaged, there is no need to uncoupled one from the other in order to perform maintenance or repairing of either one of the elements of the power unit or either one of the elements of the heat recovery circuit. Furthermore, the heat recovery circuit is operable independently of the engine rotation and is also operable on request, before or after operating the engine of the power unit.

Advantageously, the heat recovery circuit is a heat support to the power unit and, more particularly, to the fuel conduit.

The heat exchanger is started-up as soon as the power unit is running in order to acquire heat from the exhaust gases of the power unit outlet at the earliest time, or before running the engine, so that the heat recovery circuit provides heat to the fuel in the fuel conduit by means of the working fluid and the evaporator as soon as possible, thus, aiming in shutting off the heater in the shortest time possible once the evaporator are capable of independently provide heat to the fuel in the fuel conduit required for the engine of the power unit to reach operative conditions without support from the heater. That is, when the fuel reaches a temperature between 225K and 330K.

In some embodiments, the fuel inlet and/or the inlet and outlet of the evaporator and/or the inlet and outlet of the heater and/or the inlet of the engine and/or the inlet and outlet of the heat exchanger comprise inerting means.

The inerting means is a system able to produce inert gas which is injected into encapsulated areas so that said area has enhanced security, for example, regarding eventual leakage of elements located in these encapsulated areas or even in the presence of fire in said encapsulated areas.

Advantageously, the conditioning system provides fuel to the engine of the power unit at the required temperature at any time of the power unit functioning, between 225K and 330K. Therefore, the conditioning system allows constant and precise control of the fuel conditions, such as pressure and temperature.

In a particular embodiment, the heat recovery circuit further comprises: a first pump, and a pressure regulator configured for regulating pressure of the working fluid.

The first pump allows to actuate over the circulation flow of the working fluid inside the heat recovery circuit and that said working fluid is in constantly flowing inside the heat recovery circuit.

In some embodiments, the first pump are located downstream the pressure regulator. In some other embodiments, the first pump are located upstream the pressure regulator.

In some embodiments, the pressure of the working fluid inside the heat recovery circuit is set at a value as high as the heat recovery system can manage in order to minimize the energy consumption of the first pump. The functioning and control of the first pump are independent from the engine functioning.

In some embodiments, the pressure of the working fluid is constant in a range 1.5 MPa to 6 MPa, preferably at 2.2 MPa.

In some embodiments, the first pump is mechanically connected to the engine of the power unit.

Advantageously, the first pump provides at least the minimum delta of pressure to the working fluid so that said working fluid is circulating inside the heat recovery circuit. In some embodiments, the minimum delta of pressure is higher or equal to 0.2 MPa and said delta is preferably as low as possible.

In a particular embodiment, the pressure of the working fluid is higher than the pressure of the fluid of the fluid conduit.

In a particular embodiment, the heat recovery circuit (8) further comprises a first bypass conduit configured to connect a first portion of the heat recovery circuit and a second portion of the heat recovery circuit, wherein the first portion is located upstream the inlet of the heat exchanger and the second portion of the second conduit is located downstream the outlet of the heat exchanger.

Advantageously, the first bypass actuates as a control and active system of the temperature of the working fluid right at the inlet and at the outlet of the heat exchanger.

In a particular embodiment, the heat recovery circuit further comprises a second bypass conduit configured to connect a third portion of the heat recovery circuit and a fourth portion of the heat recovery circuit, wherein the third portion is located between the evaporator and the first portion of the heat recovery circuit, and wherein the fourth portion of the heat recovery circuit is located between the second portion of the heat recovery circuit and the evaporator.

In a particular embodiment, the first bypass conduit comprises a first bypass valve, and the second bypass conduit comprises a second bypass valve.

In a particular embodiment, the heat exchanger is configured for enclosing entire perpendicular cross-section of the power unit outlet.

Enclosing the area of power unit outlet completely with the heat exchanger ensures exploiting the most heat transferred to the working fluid relatively to the heat produced by the power unit outlet.

In a particular embodiment, the heater are located downstream the evaporator and upstream the engine.

Advantageously, by placing the heater downstream the evaporator, the fuel provided at the inlet of the heater is injected at a higher temperature than the fuel at the inlet of the evaporator. Therefore avoiding possible damages of the heater by requiring high heating performance and eventual damages of the fuel conduit due to low temperature of the fuel.

In a more particular embodiment, the conduit between the heater and the engine is a flexible hose.

In a particular embodiment, the heater are located upstream the evaporator and the engine is located downstream the evaporator.

In a more particular embodiment, the conduit between the evaporator and the engine is a flexible hose.

Advantageously, thanks to this specific arrangement, the fuel is heated even when the conditioning system is cold, that is during start-up process, and thus prevent that the heat recovery circuit, in particular the working fluid, freezes.

In a particular embodiment, the conditioning system further comprises second pump and a valve, wherein the second pump and the valve are configured to supply fuel to the power unit.

The pump rises the pressure of the fuel, in liquid form, before entering the power unit. The valve provides to the system the ability to open or close the passage of the fuel to the power unit from the fuel inlet.

Preferably, the second pump are located upstream the valve and the valve is located upstream the fuel inlet of the power unit. Also preferably, both the second pump and the valve are mechanical.

In a particular embodiment, the fuel conduit of the evaporator and the heat recovery circuit are mounted in counterflow.

Mounting the fuel conduit of the evaporator and the heat recovery circuit in counterflow allows to supply the most heat provided but the working fluid of the heat recovery circuit at the inlet of the evaporator which is where the fuel in the fuel conduit is colder. While the temperature of the working fluid is decreasing inside the heat recovery circuit since it transfers heat to the fuel in the fuel conduit increasing its temperature and facilitating the phase change of the fuel from liquid form into gas form. The heat recovery circuit is maintained connected to the fuel conduit until the outlet of the evaporator, where the temperature of the fuel in the fuel conduit is higher than its temperature at the inlet and its phase has changed; also the temperature of the working fluid is lower at the point of contact with the outlet of the evaporator than it is when it is in contact with the inlet of the evaporator.

Advantageously, the fuel conduit of the evaporator and the heat recovery circuit are mounted in counterflow in order to provide optimized heat transfer between the working fluid and the fuel.

In a particular embodiment, the evaporator comprises a second heat exchanger and a third heat exchanger.

In the whole document, the heat exchanger of the heat recovery circuit is to be considered the first heat exchanger.

In this particular embodiment, the second heat exchanger is located downstream the first heat exchanger which is the point where the working fluid is at its highest temperature. On the other end, the second heat exchanger is also located downstream the fuel inlet which is the point where the fuel is at its lowest temperature in the conditioning system. Thus, the second heat exchanger provides a temperature delta between the working fluid and the fuel which provides a change of the specific volume of the fuel at this specific location of the fuel conduit in order to start the phase change, that is, from liquid form or supercritical fluid form (SCF) into low temperature gas form.

In the same particular embodiment, the third heat exchanger is located downstream the second heat exchanger and provides another contact point between the heat recovery system and the fuel conduit so that the residual temperature delta between the working fluid and the fuel in the fuel conduit is able to provide overheating to the fuel after its phase change.

In a particular embodiment, the heat recovery circuit comprises at least one temperature sensor and/or at least one pressure sensor.

Controlling pressure along the heat recovery circuit ensures a correct monitoring of the pressure of the working fluid along the heat recovery circuit and, thus, optimizing the conditioning of the fuel in the fuel conduit ensuring the active control provided by the conditioning system.

In a particular embodiment, the fluid of the fluid conduit is hydrogen (H2) and/or the working fluid of the heat recovery circuit is Nitrogen (N2), Helium (He), or a mixture of Nitrogen (N2) and Helium (He), and/or ethylene glycol water (EGW).

In some embodiments, the fluid of the fluid conduit is pure hydrogen.

In some other embodiments, the fluid of the fluid conduit is a mixture of hydrogen and fuel such as methane, propane, butane etc. In the particular case of the fluid of the fluid conduit being a mixture, hydrogen is the majority of the mixture.

In a particular embodiment, both the evaporator and the heater are encapsulated and/or wherein both the second pump and the valve are encapsulated.

Advantageously, to encapsulate some particular elements of the conditioning system, such as the evaporator and the heater or the second pump and the valve, secures the rest of the conditioning system in case of leakage of fuel from the fuel conduit where these critical elements are located.

In a second inventive aspect, the present invention provides an aircraft comprising a conditioning system according to the first inventive aspect of the invention.

In a third inventive aspect, the invention provides a method for conditioning fuel of conditioning system according to the first inventive aspect of the invention, when the aircraft is on ground or in flight, the method comprising the following steps:

actuating the heater configured for supplying additional heat to the fuel in the fuel conduit until a fuel temperature reference value $T_{FH}$, running the power unit, supplying heat from the heat recovery circuit to the evaporator, supplying heat from the evaporator to the fuel conduit until a fuel temperature reference value $T_{FL}$, reducing the additional heat supplied by the heater, continuing supplying heat from the heat recovery circuit to the evaporator until the fuel reaches the fuel temperature reference value $T_{FH}$, stopping the heater when the fuel temperature reference value $T_{FH}$ is reached.

In some embodiments, the heater are located downstream the evaporator.

In some embodiments, the temperature reference value $T_{FH}$ is lower or equal to the fuel temperature reference value $T_{FL}$.

In step a), the heater are actuated for supplying additional heat to the fuel in the fuel conduit so that the temperature of the fuel reaches the temperature reference value $T_{FH}$ in order to avoid damaging the fuel conduit and the engine of the conditioning system that are located downstream the heater.

In some embodiments, the temperature reference value $T_{FH}$ is between 225K and 330K, preferably around 288K.

In step c) and d), after running the power unit and the exhaust gases being generated by the engine of the APU, the heat recovery circuit is supplying heat to the fuel in the fuel conduit via the working fluid and the evaporator. At this step of the method, the temperature of the fuel in the fuel conduit is raised until reaching the fuel temperature reference value $T_{FL}$.

In some embodiments, the fuel temperature reference value $T_{FL}$ is 225K.

In step e) of the method of the first inventive aspect of the invention, both the heater and the heat recovery circuit are providing heat to the fuel in the fuel conduit. In particular, at the outlet of the heater, the fuel temperature reference value $T_{FL}$ is constantly and precisely maintained at the fuel temperature reference value $T_{FL}$, preferably 288K, by the conditioning system.

Furthermore, also in step e), both the heat recovery circuit and the heater are supplying heat to the fuel in the fuel conduit but, while the heat supplied by heat recovery circuit is increasing, the heat supplied by the heater is decreasing correspondingly. In particular, when the temperature of the fuel in the fuel conduit at the outlet of the evaporator is equal or higher than the fuel temperature reference value $T_{FL}$ but still lower than the temperature reference value $T_{FH}$, the additional heat supplied by the heater is decreasing. In particular embodiments, the heater are actuated and the additional heat supplied to the fuel conduit is decreased when the temperature of the fuel in the fuel conduit at the outlet of the evaporator is in the range 225K to 330K, preferably around 288K.

In step g) of the present method, the heater are stopped once the heat recovery circuit is able to maintain, by itself, the temperature of the fuel in the fuel conduit at the temperature reference value $T_{FH}$. In particular embodiments, when the temperature reference value $T_{FH}$ at the outlet of the evaporator is 288K.

Advantageously, the method of the present invention provides a constant precise maintenance of the temperature required for the fuel of a conditioning system so that the engine is functioning in an optimal manner.

In a particular embodiment of the third inventive aspect, the second pump are configured to supply fuel at a fuel pressure reference value $P_F$ to the power unit, and the first pump and the pressure regulator are configured to maintain the working fluid at a working fluid pressure reference value $P_{WF}$.

In some embodiments, the fuel pressure reference value $P_F$ is 1.25 MPa.

In some embodiments, the working fluid pressure reference value $P_{WF}$ is constant in a range 1.5 MPa to 6 MPa, preferably at 2.2 MPa.

2.2 MPa.

Advantageously, the method of the present invention also provides a constant a precise maintenance of the pressure required for the fuel of a conditioning system so that the engine is functioning in an optimal manner.

All the features described in this specification (including the description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from an embodiment of the invention, given just as an example and not being limited thereto, with reference to the drawings.

DETAILED DESCRIPTION

Figure 1:
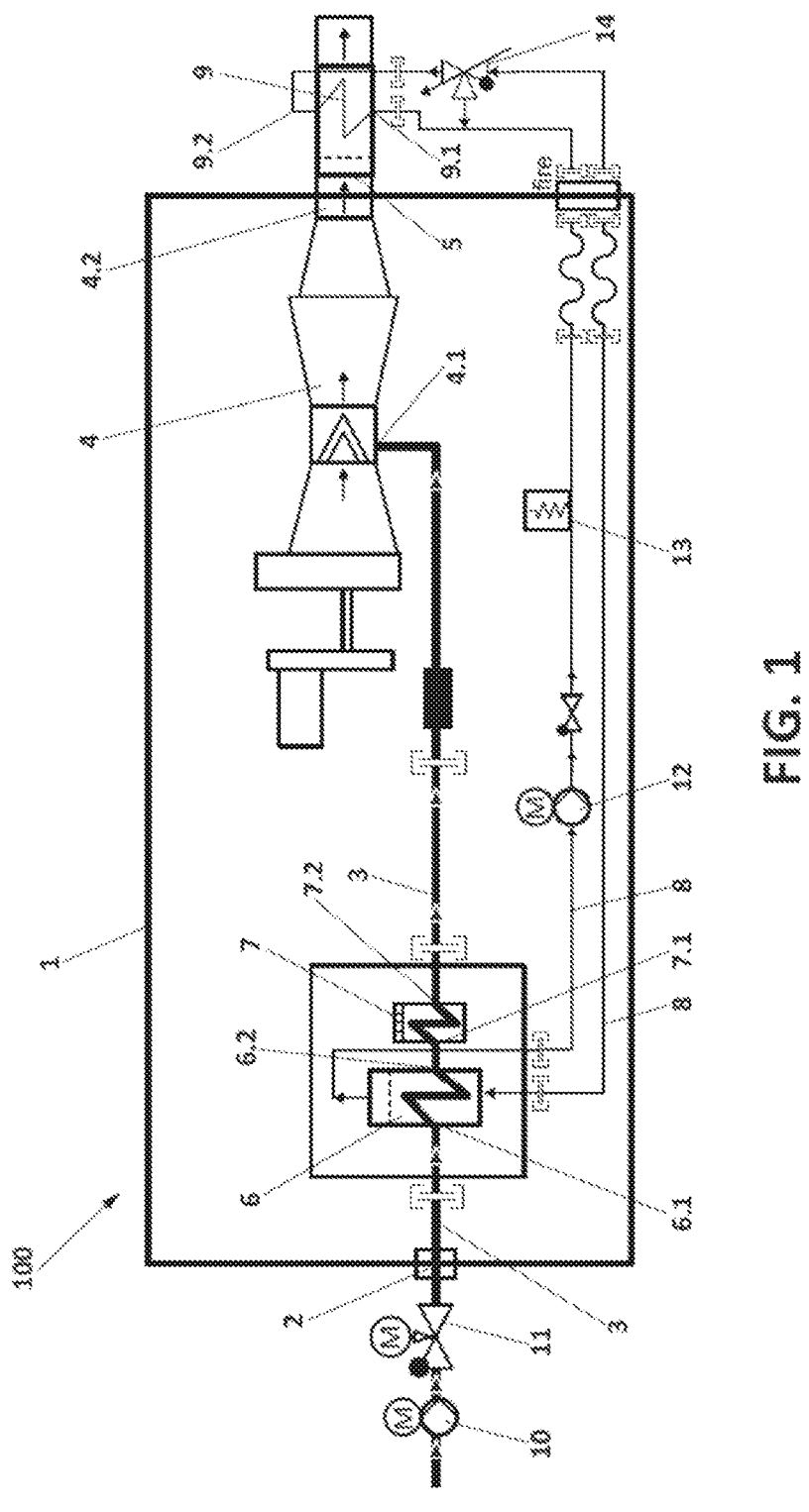
FIG. 1 shows an embodiment of the conditioning system according to the present invention.

FIG. 1 shows a schematic representation of a conditioning system (100) for an aircraft according to an embodiment of the invention.

In the embodiment of FIG. 1, the conditioning system (100) comprises a power unit (1) which comprises a fuel inlet (2), a fuel conduit (3), an engine (4), a power unit outlet (5), evaporator (6) and heater (7). In some embodiments, the power unit (1) is an Auxiliary Power Unit or APU. In some other embodiments, the power unit (1) is a propeller for a ram air turbine (RAT).

In some embodiments, the fuel is hydrogen. In some embodiments, the hydrogen is stored at 20K, before being injected into the power unit (1), and the conditioning system (100) provides heat to the hydrogen such that the temperature of the hydrogen before entering the engine (4) is constant at 288K. Also in some embodiments, the fuel, preferably hydrogen, is injected in the conditioning system (100) at 1.25 MPa.

The fuel inlet (2) is configured to supply liquid fuel to the fuel conduit (3) and the fuel conduit (3) connect the fuel inlet (2) to the engine (4). The engine (4) comprises an inlet (4.1) and an outlet (4.2) connected to the power unit outlet (5). The power unit outlet (5) is configured to exhaust gases out of the engine (4). In particular embodiments, the engine (4) is a gas turbine.

Then, in the embodiment of FIG. 1, the evaporator (6) is connected to the fuel inlet (2) by the fuel conduit (3) and comprise a fuel inlet (6.1) and a fuel outlet (6.2). The evaporator (6) is configured to supply heat to the fuel in the fuel conduit (3) and to transition the fuel in the fuel conduit (3) from liquid form into gas form. In some embodiments, the fuel injected into the evaporator (6) is completely turned into gas form at the fuel outlet (6.2) of the evaporator (6).

The evaporator (6) may include one or more heat exchangers such as first, second and third heat exchangers.

Also in FIG. 1, the power unit (1) of the conditioning system (100) includes a heater (7) located downstream the evaporator (6). The heater (7) comprise a fuel inlet (7.1) connected to the fuel outlet (6.2) of the evaporator (6) via the fuel conduit (3) and the heater (7) also comprise a fuel outlet (7.2). The heater (7) is configured to supply heat to the fuel in the fuel conduit (3). In particular, the heater (7) provides additional heat to the fuel flowing through the fuel conduit (3) downstream of evaporator (6).

The heater (7) supports the conditioning system (100) in such a way that, when the engine is not running, the heat provided to the fuel in the fuel conduit (3) is supplied by the heater (7). While the engine is running when the conditioning system (100) is in a full operative mode, the heat transferred from the working fluid of the heat recovery circuit (8) to the fuel in the fuel conduit (3) provides all heat required to heat the fuel in the fuel conduit (3). The heater (7) may be turned-off when the heat recovery circuit (8) is providing all of the heat applied to the fuel in the fuel conduit (3).

In some other embodiments, the heater (7) is located upstream the evaporator (6).

In some embodiments, the heater (7) is an electric heater and provided with dedicated battery so that power for the heater (7) is independent of the rest of elements of the conditioning system (100).

Also in some embodiments, the evaporator (6) and the heater (7) is encapsulated in order to avoid leakage outside the encapsulation of the evaporator (6) and/or the heater (7) which would damage the rest of the conditioning system (100).

Back to the embodiment of FIG. 1, the fuel conduit (3) connects the fuel outlet (7.2) of the heater (7) to the inlet (4.1) of the engine (4).

In some embodiments, the fuel conduit (3) between the heater (7) and the engine (4) is a flexible hose.

The conditioning system (100) depicted in FIG. 1 also comprises a heat recovery circuit (8). The heat recovery circuit (8) comprises a heat exchanger (9) in fluid communication with the evaporator (6), and a working fluid. The working fluid is running along the whole heat recovery circuit (8) at a working fluid pressure reference value $P_{WF}$.

The heat exchanger (9) is connected to the power unit outlet (5) and comprises an inlet (9.1) and an outlet (9.2). The heat exchanger (9) is configured to transfer heat from the exhaust gases of the power unit outlet (5) to the working fluid located inside the heat recovery circuit (8). The heat exchanger (9) is also configured to supply the working fluid from the heat exchanger (9) to the evaporator (6) and the evaporator (6) is configured to supply the working fluid heat from the working fluid of the heat recovery circuit (8) to the fuel in the fuel conduit (3).

Preferably, the heat exchanger (9) is configured for covering the whole area of the power unit outlet (5) so that the maximum heat is generated from the exhaust gases of the engine (4) and transferred to the working fluid of the heat recovery circuit (8).

Also preferably, the working fluid of heat recovery circuit (8) is Nitrogen ($N_2$) or Helium (He), or a mixture of Nitrogen ($N_2$) and Helium (He), and/or ethylene glycol water (EGW).

Also depicted in the embodiment of FIG. 1, the heat recovery circuit (8) comprises first pump (12) located downstream the evaporator (6) which actuates over the circulation flow of the working fluid inside the heat recovery circuit (8). The functioning and control of the first pump (12) are independent from the engine (4). In the same embodiment, the heat recovery circuit (8) shows pressure regulator (13) located downstream the first pump (12) and configured for regulating pressure of the working fluid inside the heat recovery circuit (8). Also, the first pump (12) help providing the minimum delta of pressure necessary for the working fluid to flow inside the heat recovery circuit (8).

In some embodiments, the pressure of the working fluid is higher than the pressure of the fluid of the fluid conduit (3).

Also in the embodiment shown in FIG. 1, the heat recovery circuit (8) comprises a first bypass conduit (14) configured to connect a first portion of the heat recovery circuit and a second portion of the heat recovery circuit. The first portion is located upstream the inlet (9.1) of the heat exchanger (9) and the second portion of the second conduit is located downstream the outlet (9.2) of the heat exchanger (9).

In some embodiments, the heat exchanger (9) is a pillow plate heat exchanger type. Pillow plate heat exchangers provide high performance in a more compact structure and lower weight than common heat exchangers while providing good structural stability.

In some other embodiments, the heat recovery circuit (8) comprises a second bypass conduit configured to connect a third portion of the heat recovery circuit (8) and a fourth portion of the heat recovery circuit (8). The third portion is located between the evaporator (6) and the first portion of the heat recovery circuit (8), and the fourth portion of the heat recovery circuit (8) is located between the second portion of the heat recovery circuit (8) and the evaporator (6).

In the embodiment of FIG. 1, the conditioning system (100) further comprises second pump (10) and a valve (11), both configured to supply fuel to the power unit (1). In particular, the second pump (10) helps maintaining pressure of fuel injection inside the power unit (1) at the inlet (2). Also, the valve (11) allows opening and closing the conditioning system (100) in case of performing maintenance or in any event requiring closing the fuel entry in the power unit (1).

Also in the embodiment depicted in FIG. 1, the second pump (10) and the valve (11) are encapsulated which avoid any leakage of fuel outside of the encapsulated area when both the second pump (10) and the valve (11) are considered critical elements with high risk of leakage.

In some embodiments, the fuel conduit (3) of the evaporator (6) and the heat recovery circuit (8) are mounted in counterflow. By mounting the fuel conduit (3) and the heat recovery circuit (8) in counterflow, the conditioning system (100) improves the heat exchange between the fuel in the fuel conduit (2) and the working fluid of the heat recovery circuit (8) such that at the temperature of the working fluid is higher when in contact with the fuel outlet (6.2) of the evaporator (6) and the temperature of the working fluid is lower in the portion of the heat recovery circuit (8) in contact with the fuel inlet (6.1) of the evaporator (6). Advantageously, with counterflow, the delta of temperature for two corresponding points between the temperature of the working fluid and the temperature of the fuel inside the evaporator (6) is positive which ensures optimal heat transfer from the working fluid to the fuel.

In some embodiments, not shown in FIG. 1, the heat recovery circuit (8) comprises at least one temperature sensors and/or at least one pressure sensor. Preferably before and after supplying heat to the evaporator (6) and also before and after the heat exchanger (9).

Method for Conditioning Fuel

In the embodiment of FIG. 1, the fuel is injected in liquid form through the inlet (2) of the power unit (1) at a fuel pressure reference value $P_F$, preferably at 1.25 MPa. The second pump (10) is configured to supply the fuel and maintain at all times during operation mode of the conditioning system (100) such that the fuel in the fuel conduit (3) is at the fuel pressure reference value $P_F$.

In parallel, once the power unit is running, the first pump (12) and the pressure regulator (13) of the heat recovery circuit (8) are configured to maintain the working fluid at a pressure reference value $P_{WF}$, preferably at 2.2 MPa.

The conditioning system (100), through the method previously described in the present document, is able to maintain, in a constant and precise manner, the temperature and pressure conditions of the fuel in the fuel conduit (3).

In that sense, since the heat recovery circuit (8) is not capable of generating heat from the exhaust gases right at the initiation of the power unit (1) of the conditioning system (100), because of the lack of exhaust gases at this stage, the heater (7) is actuated in order to supply additional heat to the fuel in the fuel conduit (3) until the fuel reaches a fuel temperature reference value $T_{FH}$. In particular, the heater (7) is thus responsible for supplying all the heat necessary to the fuel in the fuel conduit (3) until the fuel reaches the fuel temperature reference value $T_{FH}$, preferably 288K.

As the engine (4) starts and increases power, the heat recovery circuit (8) gradually increases the heat it transfers from exhaust gases generated by the engine (4) to the working fluid by means of the heat exchanger (9). At this stage, the heat provided by the working fluid to the fuel in the fuel conduit (3) is not enough to heat the fuel to the desired fuel temperature reference value $T_{FH}$. That is, the heater (7) provides the complement of thermal energy necessary to reach said fuel temperature reference value $T_{FH}$, preferably 288K, while the heat recovery circuit (8) increases its heat output.

As the temperature of the working fluid at the outlet of the evaporator (6) approaches or reaches a fuel temperature reference value $T_{FL}$, preferably 225K, the additional heat provided by the heater (7) is progressively decreased. In other words, as the heat generated by the exhaust gases and transferred to the working fluid increases, there is a corresponding increase in the heat transferred by the heat exchanger (9) to the fuel in the conduit.

Finally, when the temperature at the outlet of the evaporator (6) is equal to the fuel temperature reference value $T_{FH}$, preferably 288K, the heater (7) is stopped. When the heater is stopped, the temperature of the fuel in the fuel conduit (3) is fully dependent of the heat provided by the heat recovery circuit (8) and, by extension, on heat from the exhaust gases generated by the engine (4) of the power unit (1).

Figure 2:
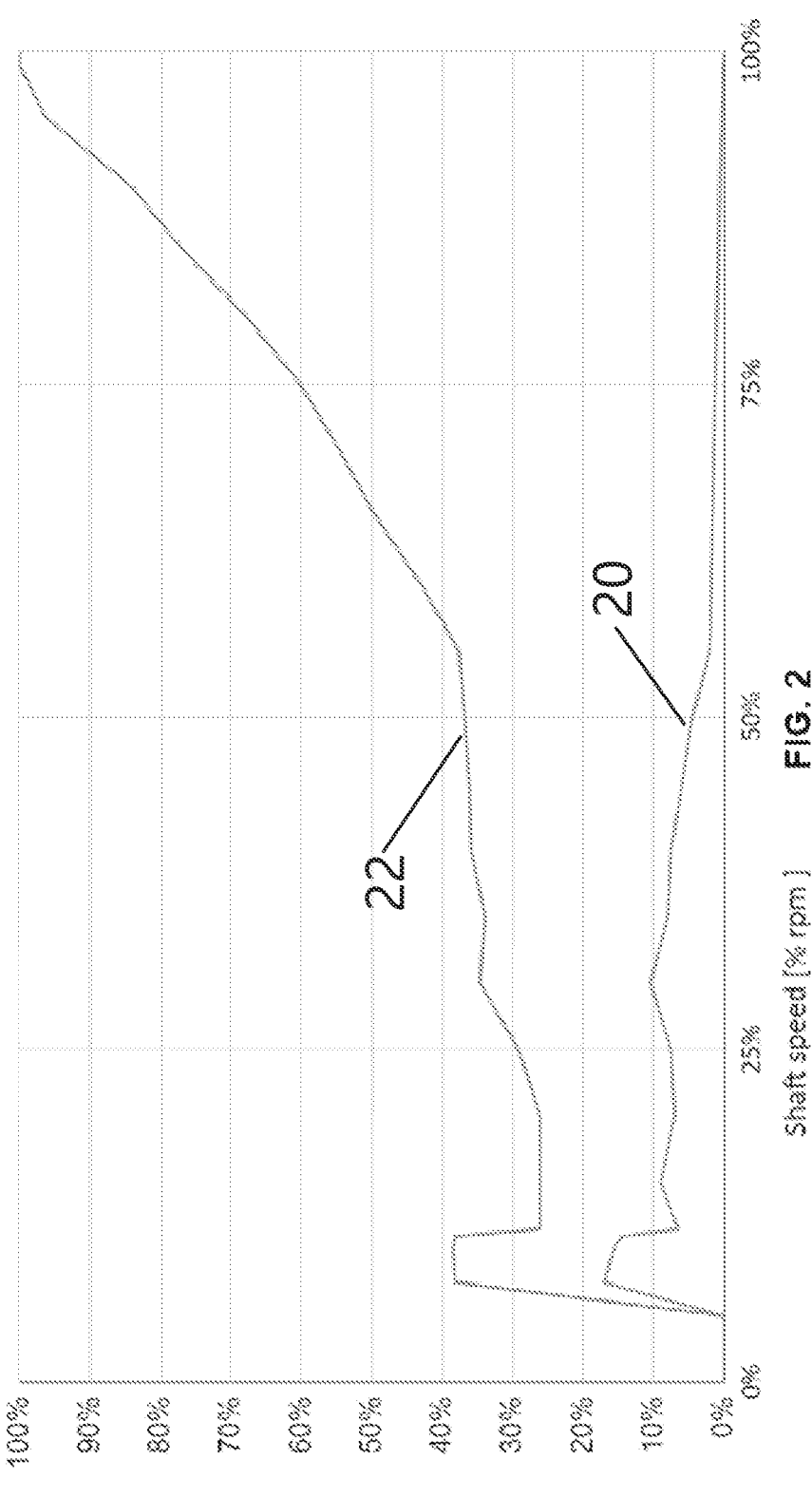
FIG. 2 shows a graphic representing the power supplied by the heater and the heater power of a system without a recovery circuit such as the one of the present invention, all with respect to the shaft speed of an engine according to an embodiment of the invention.

FIG. 2 is a graphic depicting two lines. The first line 20, the one at the bottom, is representing the power provided by the heater with respect to the engine shaft speed. The second line 22, the one at the top, is representing the required power for a shaft speed to be operative, preferably until running in optimal conditions.

As shown in FIG. 2, at low shaft speeds, such as near 0%, which is considered the point of running a power unit, the heater is capable of providing the totality, or close to the totality, of power needed by the engine so that the engine can start but the engine is not generating enough exhaust gases for the heat recovery circuit to provide enough power. Once the required power from the engine exceeds the 50% of the shaft speed, the power required from the engine power unit increase notably. Between 0% and 50% of the engine shaft speed, the heater compensates and acts as support by providing additional power/heat which is needed for the fuel to be in its optimal conditions and be injected into the engine of the power unit.

In the particular case of the present invention, the delta between the first line 20 and the second line 22, as shown in FIG. 2, is the power generated by the heat recovery circuit and produced by the evaporator recuperated/recycled from the heat of the exhaust gases. Once the engine is producing enough exhaust gases, passed 50% of the shaft speed as shown in the graphic of FIG. 2, the conditioning system enters in a phase where it is more dependent of the power provided by the heat recovery system and less dependent of the heater. That is what represents FIG. 2 between 50 to 100% of the shaft speed.

In particular, after reaching 50% of the engine shaft speed, the heater power tends to 0. That is, when the heat recovery circuit of the conditioning system provides the totality of power needed by the engine to function without help of the heater. Therefore, the heater are stopped once the engine is reaching its optimal running conditions and the heat recovery system is responsible for generating enough heat and recycling enough heat from the exhaust gases so that the totality of power required for the engine shaft speed to be at 100%.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A conditioning system for an aircraft including a power unit wherein the power unit comprises:

a conduit fuel inlet configured to supply a fuel to a fuel conduit, wherein the fuel at the conduit fuel inlet is in a liquid fuel phase or a supercritical fluid (SCF) phase, an engine including an engine fuel inlet in fluid communication with the fuel conduit and an engine exhaust gas outlet in fluid communication with a power unit outlet configured to exhaust combustion gases generated by the engine, wherein the power unit outlet includes a duct downstream of the engine exhaust outlet in the flow of the exhaust combustion gases;

an evaporator including an evaporator fuel inlet and an evaporator fuel outlet each in fluid communication with the fuel conduit, wherein the evaporator is configured to supply heat to the fuel in the liquid fuel phase or the SCF phase flowing from the fuel conduit through the evaporator to convert the fuel in the liquid fuel phase or the SCF phase to a gaseous fuel phase and exhaust the fuel in the gaseous fuel phase through the evaporator fuel outlet into the fuel conduit and to the engine fuel inlet, a heater including a heater fuel inlet and a heater fuel outlet each in fluid communication with the fuel conduit, wherein the heater is configured to supply heat to the fuel flowing through the fuel conduit while a temperature of the fuel at the outlet of the evaporator or heater is below a first fuel temperature reference, continue to provide heat to the fuel while the temperature of the fuel at the outlet of the evaporator is below a second fuel temperature reference, which is hotter than the first fuel temperature reference, and cease heating the fuel while the temperature of the fuel at the outlet of the evaporator or heater is above the second fuel temperature reference, and a heat recovery circuit including a heat exchanger and working fluid conduits coupled to the heat exchanger and the evaporator, where a working fluid circulates between the evaporator and the heat exchanger via the working fluid conduits, wherein the heat exchanger is positioned in or adjacent the power unit outlet and is configured to transfer heat from the exhaust combustion gases to the working fluid, wherein the heat exchanger is configured to transfer heat from the working fluid to the fuel flowing through the fuel conduit while the temperature of the fuel at the outlet of the evaporator or heater is above the first fuel temperature reference, wherein the heater and the evaporator are configured to jointly supply heat to the fuel while the fuel temperature at the outlet of the evaporator or heater is above the first fuel temperature reference and below the second fuel temperature reference, wherein the evaporator is configured to continue to supply heat from the working fluid of the heat recovery circuit to the fuel flowing through the fuel conduit while the temperature of the fuel at the outlet of the evaporator or heater is above the second fuel temperature reference, wherein the heater includes an electric heater configured to receive electrical energy to apply the heat to the fuel.

2. The conditioning system according to claim 1, wherein the heat recovery circuit further comprises:

a first pump, and a pressure regulator configured to regulate pressure of the working fluid in the heat recovery circuit.

3. The conditioning system according to claim 1, wherein a pressure of the working fluid in the heat recovery circuit is higher than a pressure of the fuel while in the gaseous phase in the fuel conduit.

4. The conditioning system according to claim 1, wherein the heat recovery circuit further comprises:

a first bypass conduit connecting a first conduit portion of the heat recovery circuit to a second conduit portion of the heat recovery circuit, wherein the first conduit portion is a first working fluid passage connecting a working fluid inlet of the heat exchanger and to a working fluid outlet of the evaporator, and the second conduit portion is a second working fluid passage connecting a working fluid outlet of the heat exchanger to a working fluid inlet to the evaporator.

5. The conditioning system according to claim 1, wherein the heat exchanger is configured to enclose an entire perpendicular cross-section of the duct of the power unit outlet.

6. The conditioning system according to claim 1, wherein, relative to a flow of the fuel through the fuel conduit, the heater is downstream of the evaporator in a flow of the fuel and upstream of the engine in the flow of the fuel.

7. The conditioning system according to claim 1, wherein, relative to a flow of the fuel through the fuel conduit, the heater is upstream of the evaporator in the flow of the fuel and the engine is downstream of the evaporator in the flow of the fuel.

8. The conditioning system according to claim 2, wherein the conditioning system further comprises a second pump and a first valve, wherein the first pump and the first valve are configured
  to supply fuel to the power unit.

9. The conditioning system according to claim 1, wherein the fuel flows through the evaporator counterflow to a flow of the working fluid through the evaporator.

10. The conditioning system according to claim 1, wherein the heat recovery circuit comprises a temperature sensor and/or a pressure sensor.

11. The conditioning system according to claim 1, wherein the liquid fluid or SCF fluid in the fluid conduit is hydrogen ($H_2$) and/or the working fluid of the heat recovery circuit is Nitrogen ($N_2$), Helium (He), or a mixture of Nitrogen ($N_2$) and Helium (He) and/or ethylene glycol water (EGW).

12. The conditioning system according to claim 8, wherein the evaporator and the heater are encapsulated and/or wherein the first pump and the first valve are encapsulated.

13. An aircraft comprising the conditioning system according to claim 1.

* * * * *